(12) United States Patent
Liu

(10) Patent No.: US 9,973,233 B2
(45) Date of Patent: May 15, 2018

(54) INTERFERENCE CANCELLATION APPARATUS AND METHOD

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/258,869

(22) Filed: Sep. 7, 2016

(65) Prior Publication Data
US 2016/0380669 A1  Dec. 29, 2016

Related U.S. Application Data

(63) Continuation of application No. PCT/CN2014/073059, filed on Mar. 7, 2014.

(51) Int. Cl.
*H04B 7/04* (2017.01)
*H04B 1/525* (2015.01)
(Continued)

(52) U.S. Cl.
CPC .............. *H04B 1/525* (2013.01); *H04B 7/04* (2013.01); *H04L 5/14* (2013.01); *H04L 27/34* (2013.01)

(58) Field of Classification Search
CPC .......... H04B 1/525; H04B 15/00; H04B 1/44; H04L 5/143; H04L 25/0224
See application file for complete search history.

(56) References Cited

U.S. PATENT DOCUMENTS 5,691,978 A * 11/1997 Kenworthy ............ H04B 1/408
  370/278
7,869,527 B2 * 1/2011 Vetter .................. H04L 27/366
  375/259
(Continued)

FOREIGN PATENT DOCUMENTS

CN  101529729 A  9/2009
CN  101604985 A  12/2009
(Continued)

*Primary Examiner* — Chieh M Fan
*Assistant Examiner* — Berhanu Tadese

(57) ABSTRACT

Embodiments of the present invention provide an interference cancellation apparatus. The apparatus includes: a splitter, configured to send an acquired reference signal to a first and second main-path interference canceller; a main receive antenna, configured to send an acquired first receive signal to the first main-path interference canceller; the first main-path interference canceller, configured to perform first main-path interference cancellation processing on the first receive signal according to the reference signal, to generate a first processing signal; a reference receive antenna, configured to acquire and send a second receive signal to the second main-path interference canceller; the second main-path interference canceller, configured to perform second main-path interference cancellation processing on the second receive signal according to the reference signal, to generate a second processing signal; and a near-field interference canceller, configured to perform near-field interference cancellation processing on the first processing signal according to the second processing signal.

18 Claims, 5 Drawing Sheets

(51) Int. Cl.
*H04L 27/34* (2006.01)
*H04L 5/14* (2006.01)

(56) References Cited

U.S. PATENT DOCUMENTS

| | | | | |
|---|---|---|---|---|
| 8,055,235 | B1* | 11/2011 | Gupta | H04B 1/10 |
| | | | | 455/296 |
| 9,331,737 | B2* | 5/2016 | Hong | H04B 1/56 |
| 9,490,963 | B2* | 11/2016 | Choi | H04L 5/1461 |
| 2003/0224751 | A1* | 12/2003 | Vanderhelm | H04B 1/126 |
| | | | | 455/296 |
| 2006/0030287 | A1 | 2/2006 | Vanderhelm et al. | |
| 2007/0207747 | A1 | 9/2007 | Johnson et al. | |
| 2008/0267277 | A1* | 10/2008 | Huang | H04L 7/0029 |
| | | | | 375/234 |
| 2012/0201173 | A1 | 8/2012 | Jain et al. | |
| 2012/0263078 | A1* | 10/2012 | Tung | H04B 7/15564 |
| | | | | 370/277 |
| 2013/0114468 | A1* | 5/2013 | Hui | H01Q 3/2611 |
| | | | | 370/277 |
| 2013/0301487 | A1* | 11/2013 | Khandani | H04W 16/14 |
| | | | | 370/278 |
| 2014/0348018 | A1* | 11/2014 | Bharadia | H04L 5/1461 |
| | | | | 370/252 |
| 2015/0270865 | A1* | 9/2015 | Polydoros | H04B 1/62 |
| | | | | 375/346 |
| 2016/0226653 | A1* | 8/2016 | Bharadia | H04B 1/525 |
| 2016/0285502 | A1* | 9/2016 | Liu | H04B 1/525 |
| 2017/0005773 | A1* | 1/2017 | Liu | H04B 1/525 |

FOREIGN PATENT DOCUMENTS

| | | | | |
|---|---|---|---|---|
| CN | 103518339 A | | 1/2014 | |
| EP | 3043483 A1 | * | 7/2016 | H04B 3/23 |
| EP | 3065439 A1 | * | 9/2016 | H04L 25/03006 |
| EP | 3068055 A1 | * | 9/2016 | H04B 1/525 |
| WO | WO 2015131397 A1 | * | 9/2015 | H04B 1/525 |

* cited by examiner

… (1)

INTERFERENCE CANCELLATION APPARATUS AND METHOD

CROSS-REFERENCE TO RELATED APPLICATIONS

This application is a continuation of International Application No. PCT/CN2014/073059, filed on Mar. 7, 2014, which is hereby incorporated by reference in its entirety.

TECHNICAL FIELD

Embodiments of the present invention relate to the field of communications technologies, and more specifically, to an interference cancellation apparatus and method.

BACKGROUND

In a wireless communications system such as a mobile cellular communications system, a wireless local area network (WLAN), or fixed wireless access (FWA), a communication node such as a base station (BS), an access point (AP), a relay station (RS), or user equipment (UE) generally has a capability of transmitting a signal of the communication node itself and a capability of receiving a signal from another communication node. As a wireless signal is greatly attenuated in a radio channel, compared with a signal transmitted by a communication node itself, a signal from a communication peer end is extremely weak when arriving at a receive end. For example, in a mobile cellular communications system, a difference between power of a receive signal of a communication node and power of a transmit signal of the communication node reaches 80 dB-140 dB or is even larger. Therefore, to avoid self-interference caused by a transmit signal on a receive signal of a same transceiver, sending and receiving of a wireless signal are generally distinguished by using different frequency bands or time periods. For example, in frequency division duplex (FDD), different frequency bands that are separated by a specific protection frequency band are used to perform communication during sending and receiving; in time division duplex (TDD), different time periods that are separated by a specific protection time interval are used to perform communication during sending and receiving, where a protection frequency band in an FDD system and a protection time interval in an TDD system are to ensure that receiving and sending are fully separated, to avoid interference caused by sending to receiving.

Different from those in an existing FDD or TDD technology, in a wireless full-duplex technology, receiving and sending operations may be simultaneously performed on a same radio channel; in this case, theoretically, spectral efficiency of the wireless full-duplex technology is twice that of the FDD or TDD technology. Obviously, a premise for implementing wireless full-duplex lies in avoiding, reducing, and canceling as much as possible strong interference (which is called self-interference) caused by a transmit signal on a receive signal of a same transceiver, so that the transmit signal does not affect correct receiving of a desired signal.

FIG. 1 is a schematic block diagram of an interference suppression principle of an existing wireless full-duplex system, where a DAC (digital-to-analog converter), up-conversion, and power amplification that are of a transmit path, a low noise amplifier (LNA), down-conversion, and an ADC (analog-to-digital converter) that are of a receive path, and the like are functional modules of an intermediate frequency/radio frequency unit in an existing transceiver. Cancellation of self-interference caused by a transmit signal is completed by using units such as space interference suppression, analog interference cancellation at a radio frequency front-end, digital interference cancellation, and the like shown in the figure.

Because strength of a self-interference signal in a receive signal that undergoes space interference suppression is far greater than strength of a desired signal, the receive signal may cause block of an LNA module and the like at a receiver front-end. Therefore, before the LNA, the analog interference cancellation module at the radio frequency front-end uses, as a reference signal, a coupled radio frequency signal that undergoes power amplification at a transmit end, and the reference signal is adjusted by using an estimated parameter such as amplitude and a phase of a channel from a local transmit antenna to a receive antenna, so that the reference signal is as close as possible to a self-interference signal component in the receive signal, thereby canceling, in an analog domain, a local self-interference signal received by the receive antenna.

As shown in FIG. 1, in the existing wireless full-duplex system, radio frequency analog self-interference suppression is completed before the LNA. However, besides a main-path self-interference signal component formed when a transmit signal arrives at a transmit antenna from a receive antenna by means of line-of-sight (LOS) propagation, the transmit signal propagated in space may also enter the receive antenna after being transmitted by a scatterer; in this case, a self-interference signal further includes other components such as a near-field reflected self-interference signal and a far-field reflected self-interference signal.

FIG. 2 shows composition of a self-interference signal. As shown in FIG. 2, power of a far-field reflected self-interference signal component is extremely small. Therefore, the far-field reflected self-interference signal component does not affect a receive path after an LNA, and interference cancellation may be performed on a base band by using a digital filter after an analog-to-digital converter (ADC). However, power of a near-field reflected self-interference signal component is relatively large, which may cause saturation of a receiver after the LNA.

Therefore, it is expected to provide a technology that can cancel a near-field reflected self-interference component.

SUMMARY

Embodiments of the present invention provide an interference cancellation apparatus and method, which can cancel a near-field reflected self-interference component.

According to a first aspect, an interference cancellation apparatus is provided, and the apparatus includes: a splitter 110, a main receive antenna 120, a first main-path interference canceller 130, at least one reference receive antenna 140, at least one second main-path interference canceller 150, and at least one near-field interference canceller 160, where the at least one reference receive antenna 140, the at least one second main-path interference canceller 150, and the at least one near-field interference canceller 160 are in a one-to-one correspondence, a first output end 112 of the splitter 110 is connected to a transmit antenna, a second output end 114 of the splitter 110 is connected to a first input end 134 of the first main-path interference canceller 130, an output end of the main receive antenna 120 is connected to a second input end 132 of the first main-path interference canceller 130, the second output end 114 of the splitter 110 is connected to a first input end 154 of the second main-path interference canceller 150, an output end of the reference receive antenna 140 is connected to a second input end 152 of the second main-path interference canceller 150, an output end 136 of the first main-path interference canceller 130 is connected to a first input end 162 of the near-field interference canceller 160, and an output end 156 of the second main-path interference canceller 150 is connected to a second input end 164 of the near-field interference canceller 160; where the splitter 110 is configured to acquire a reference signal according to a transmit signal, and send the reference signal to the first main-path interference canceller 130 and the second main-path interference canceller 150; the main receive antenna 120 is configured to perform receiving processing to acquire a first receive signal, and send the first receive signal to the first main-path interference canceller 130; the first main-path interference canceller 130 is configured to perform first main-path interference cancellation processing on the first receive signal according to the reference signal, to generate a first processing signal; and send the first processing signal to the near-field interference canceller 160; the reference receive antenna 140 is configured to perform receiving processing to acquire a second receive signal, and send the second receive signal to the second main-path interference canceller 150; the second main-path interference canceller 150 is configured to perform second main-path interference cancellation processing on the second receive signal according to the reference signal, to generate a second processing signal; and send the second processing signal to the near-field interference canceller 160; and the near-field interference canceller 160 is configured to perform near-field interference cancellation processing on the first processing signal according to the second processing signal.

In an implementation manner of the first aspect, the main receive antenna 120 and the reference receive antenna 140 are configured in parallel, and a distance between the main receive antenna 120 and the reference receive antenna 140 is less than or equal to a first preset value, where the first preset value is determined according to a wavelength of the transmit signal.

With reference to the first aspect and any implementation manner of the foregoing implementation manners of the first aspect, in another implementation manner of the first aspect, the near-field interference canceller 160 includes: a first amplitude adjuster, configured to adjust amplitude of the second processing signal based on the first processing signal; a first phase adjuster, configured to adjust a phase of the second processing signal based on the first processing signal; and a combiner, configured to combine the first processing signal and a second processing signal that has been processed by the first amplitude adjuster and the first phase adjuster.

With reference to the first aspect and either implementation manner of the foregoing implementation manners of the first aspect, in another implementation manner of the first aspect, the near-field interference canceller 160 further includes: a delayer group, including at least one delayer, where the delayers are connected in series, and the delayer group is configured to acquire the second processing signal, and sequentially perform delay processing on the second processing signal by using each delayer; an amplitude adjuster group, including at least one second amplitude adjuster, where the at least one second amplitude adjuster is in a one-to-one correspondence with the at least one delayer, and the second amplitude adjuster is configured to adjust, based on the first processing signal, amplitude of a second processing signal that is obtained after delay processing and that is output from a corresponding delayer; a phase adjuster group, including at least one second phase adjuster, where the at least one second phase adjuster is in a one-to-one correspondence with the at least one delayer, and the second phase adjuster is configured to adjust, based on the first processing signal, a phase of the second processing signal that is obtained after delay processing and that is output from the corresponding delayer; and the combiner, specifically configured to combine the first processing signal and a processing signal obtained after the second processing signal that has been processed by the first amplitude adjuster and the first phase adjuster and a second processing signal that has been processed by the amplitude adjuster group and the phase adjuster group are combined.

According to a second aspect, an interference cancellation method is provided, where the method is performed by a communications device including a main receive antenna and at least one reference receive antenna, and the method includes: acquiring a reference signal according to a transmit signal; acquiring a first receive signal by using the main receive antenna; performing first main-path interference cancellation processing on the first receive signal according to the reference signal, to generate a first processing signal; acquiring a second receive signal by using the reference receive antenna; performing second main-path interference cancellation processing on the second receive signal according to the reference signal, to generate a second processing signal; and performing near-field interference cancellation processing on the first processing signal according to the second processing signal.

In an implementation manner of the second aspect, the main receive antenna and the reference receive antenna are configured in parallel, and a distance between the main receive antenna and the reference receive antenna is less than or equal to a first preset value, where the first preset value is determined according to a wavelength of the transmit signal.

With reference to the second aspect and any implementation manner of the foregoing implementation manners of the second aspect, in another implementation manner of the first aspect, the performing near-field interference cancellation processing on the first processing signal according to the second processing signal includes: performing amplitude adjustment processing and phase adjustment processing on the second processing signal based on the first processing signal; and combining the first processing signal with a second processing signal that is obtained after amplitude adjustment processing and phase adjustment processing.

With reference to the second aspect and either implementation manner of the foregoing implementation manners of the second aspect, in another implementation manner of the first aspect, the performing near-field interference cancellation processing on the first processing signal according to the second processing signal includes: performing amplitude adjustment processing and phase adjustment processing on the second processing signal based on the first processing signal, to generate a third processing signal; performing delay processing on the second processing signal at least once, to generate at least one fourth processing signal; separately performing the amplitude adjustment processing and phase adjustment processing on the at least one fourth processing signal based on the first processing signal, to generate at least one fifth processing signal, where the at least one fourth processing signal is in a one-to-one correspondence with the at least one fifth processing signal; and combining the at least one fifth processing signal, the third signal, and the first processing signal.

According to the interference cancellation apparatus and method in the embodiments of the present invention, a reference receive antenna is arranged, and main-path interference cancellation processing is performed on a first receive signal received by a main receive antenna and a second receive signal received by the reference receive antenna, to cancel main-path self-interference signal components in the first receive signal and the second receive signal; a near-field interference canceller performs, by using a second receive signal whose main-path self-interference signal component has been canceled, near-field interference cancellation processing on a first receive signal whose main-path self-interference signal component has been canceled, so that cancellation of a near-field reflected self-interference component in the first receive signal can be implemented.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

REFERENCE NUMERALS

Figure 1:
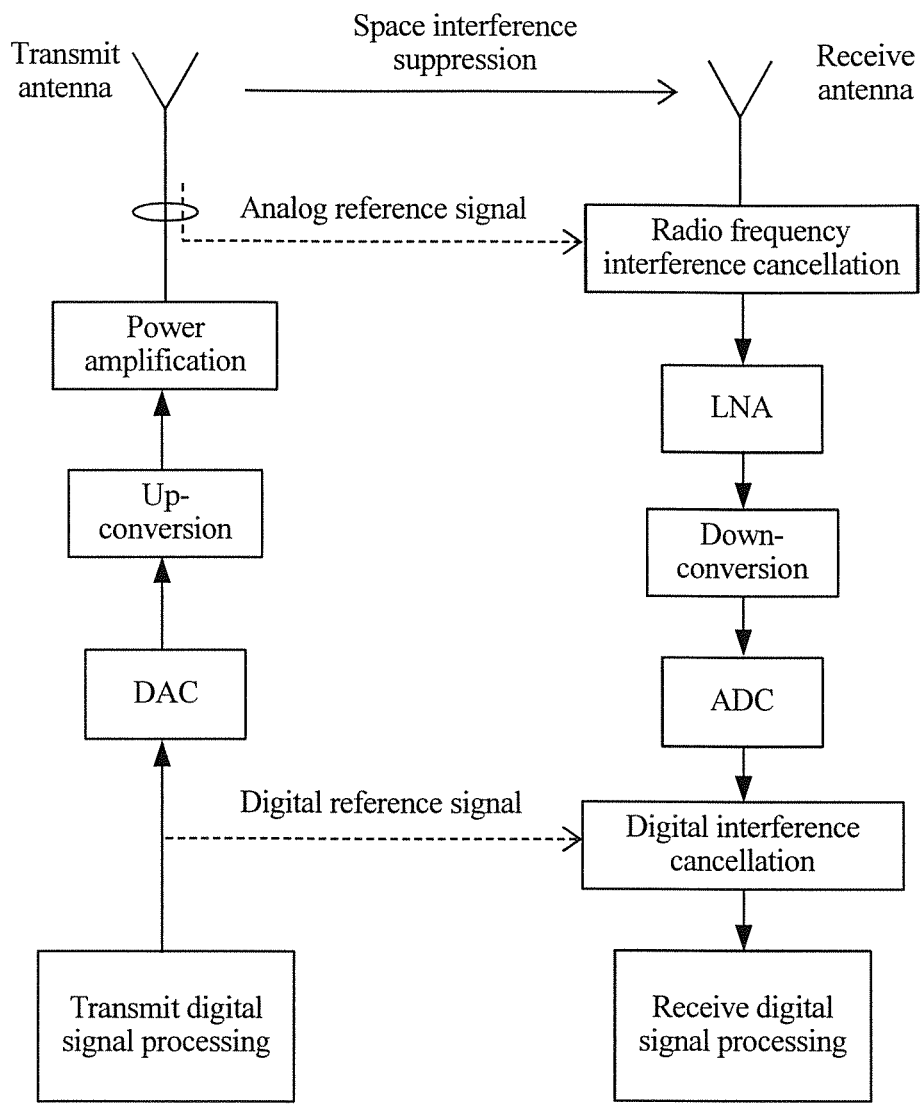
FIG. 1 is a schematic block diagram of an interference suppression principle of an existing wireless full-duplex system.

110—Splitter
111—Transmit antenna
120—Main receive antenna
130—First main-path interference canceller
132—Second input end of a first main-path interference canceller
134—First input end of a first main-path interference canceller
140—Reference receive antenna
150—Second main-path interference canceller
152—Second input end of a second main-path interference canceller
154—First input end of a second main-path interference canceller
160—Near-field interference canceller
162—First input end of a near-field interference canceller
164—Second input end of a near-field interference canceller

DETAILED DESCRIPTION

Multiple embodiments are described with reference to accompanying drawings, where same reference numerals are used to indicate same elements in this specification. To facilitate description, a large quantity of specific details are given in the following description, to provide a full understanding of one or more embodiments. However, obviously, these specific details may also not be used to implement the embodiments. In another example, a common structure and a common device are shown in a block diagram manner to describe the one or more embodiments.

Terms "part", "module", "system", and the like used in this specification are used to indicate an entity, hardware, firmware, a combination of hardware and software, software, or software in execution related to a computer. For example, a part may be but is not limited to a process running on a processor, a processor, an object, an executable file, an execution thread, a program, and/or a computer. As shown in a diagram, both an application running on a computing device and a computing device may be parts. One or more parts may camp on a process and/or an execution thread, and parts may be located on a computer and/or distributed among two or more computers. In addition, these parts may be executed on various computer readable media on which various data structures are stored. Parts may communicate, for example, according to a signal that has one or more data packets (for example, data of two parts that interact with another part from a local system, a distributed system, and/or a network, and for example, the Internet that interacts with another system by using a signal), with each other by using a local process and/or a remote process.

An interference cancellation apparatus in an embodiment of the present invention may be arranged in an access terminal that uses wireless full-duplex technologies, or the interference cancellation apparatus itself may be an access terminal that uses wireless full-duplex technologies. The access terminal may also be referred to as a system, a user unit, a user station, a mobile station, a mobile terminal, a remote station, a remote terminal, a mobile device, a user terminal, a terminal, a wireless communications device, a user agent, a user apparatus, or user equipment (UE). The access terminal may be a cellular phone, a cordless phone, a SIP (Session Initiation Protocol) phone, a WLL (Wireless Local Loop) station, a PDA (Personal Digital Assistant), a handheld device or a computing device with a radio communication function, or another processing device connected to a radio modem.

In addition, the interference cancellation apparatus in the embodiment of the present invention may further be arranged in a base station that uses wireless full-duplex technologies, or the interference cancellation apparatus itself may be a base station that uses wireless full-duplex technologies. The base station may be configured to communicate with a mobile device, and the base station may be an AP (Access Point) of WiFi, or a BTS (Base Transceiver Station) in GSM (Global System for Mobile Communications) or CDMA (Code Division Multiple Access), may be an NB (NodeB) in WCDMA (Wideband Code Division Multiple Access), or may be an eNB or eNodeB (evolved NodeB) in LTE (Long Term Evolution), a relay station or an access point, a base station device in a future 5G network, or the like.

In addition, aspects or features of the present invention may be implemented as an apparatus or a product that uses standard programming and/or engineering technologies. The term "product" used in this application covers a computer program that can be accessed from any computer readable element, carrier, or medium. For example, the computer readable medium may include but is not limited to: a magnetic storage element (for example, a hard disk, a floppy disk or a magnetic tape), an optical disc (for example, a CD (Compact Disk), and a DVD (Digital Versatile Disk)), and a smart card and a flash memory element (for example, EPROM (Erasable Programmable Read-Only Memory), a card, a stick, or a key drive). In addition, various storage media described in this specification may indicate one or more devices and/or other machine readable media that are used to store information. The term "machine readable media" may include but is not limited to a radio channel, and various other media that can store, contain, and/or carry an instruction and/or data.

It should be noted that, in this embodiment of the present invention, interference cancellation may be cancellation of all interference components (including a main-path interference signal and a near-field interference signal) in a signal, or may be cancellation of some interference components (including some main-path interference signals and some near-field interference signals) in a signal.

Figure 3:
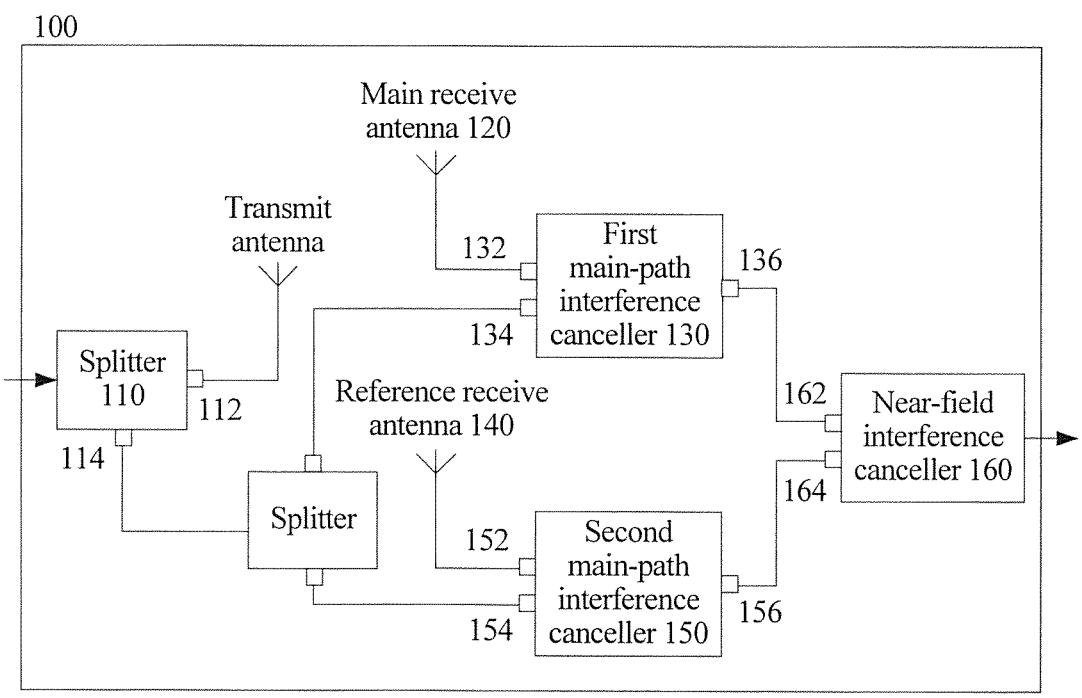
FIG. 3 is a schematic structural diagram of an interference cancellation apparatus according to an embodiment of the present invention.

FIG. 3 is a schematic structural diagram of an interference cancellation apparatus according to an embodiment of the present invention. As shown in FIG. 3, the apparatus 100 includes:

a splitter 110, a main receive antenna 120, a first main-path interference canceller 130, at least one reference receive antenna 140, at least one second main-path interference canceller 150, and at least one near-field interference canceller 160, where the at least one reference receive antenna 140, the at least one second main-path interference canceller 150, and the at least one near-field interference canceller 160 are in a one-to-one correspondence with each other, a first output end 112 of the splitter 110 is connected to a transmit antenna, a second output end 114 of the splitter 110 is connected to a first input end 134 of the first main-path interference canceller 130, an output end of the main receive antenna 120 is connected to a second input end 132 of the first main-path interference canceller 130, the second output end 114 of the splitter 110 is connected to a first input end 154 of the second main-path interference canceller 150, an output end of the reference receive antenna 140 is connected to a second input end 152 of the second main-path interference canceller 150, an output end 136 of the first main-path interference canceller 130 is connected to a first input end 162 of the near-field interference canceller 160, and an output end 156 of the second main-path interference canceller 150 is connected to a second input end 164 of the near-field interference canceller 160.

The splitter 110 is configured to acquire a reference signal according to a transmit signal, and send the reference signal to the first main-path interference canceller 130 and the second main-path interference canceller 150.

The main receive antenna 120 is configured to perform receiving processing to acquire a first receive signal, and send the first receive signal to the first main-path interference canceller 130.

The first main-path interference canceller 130 is configured to perform first main-path interference cancellation processing on the first receive signal according to the reference signal, to generate a first processing signal; and send the first processing signal to the near-field interference canceller 160.

The reference receive antenna 140 is configured to perform receiving processing to acquire a second receive signal, and send the second receive signal to the second main-path interference canceller 150.

The second main-path interference canceller 150 is configured to perform second main-path interference cancellation processing on the second receive signal according to the reference signal, to generate a second processing signal; and send the second processing signal to the near-field interference canceller 160.

The near-field interference canceller 160 is configured to perform near-field interference cancellation processing on the first processing signal according to the second processing signal.

The following separately describes connection relationships among the elements, and a structure and a function of each element in detail.

A. Main Receive Antenna 120

The main receive antenna 120 is configured to receive a signal, use the received signal as the first receive signal, and input the first receive signal to the second input end 132 of the first main-path interference canceller 130, where a process of receiving the signal by the main receive antenna 120 may be similar to a process of receiving a signal by an antenna in the prior art. Herein, a description of the process is omitted to avoid repetition.

B. Reference Receive Antenna 140

The reference receive antenna 140 is configured to receive a signal, use the received signal as the second receive signal, and input the second receive signal to the second input end 152 of the second main-path interference canceller 150, where a process of receiving the signal by the reference receive antenna 140 may be similar to a process of receiving a signal by an antenna in the prior art. Herein, a description of the process is omitted to avoid repetition.

It should be noted that, in this embodiment of the present invention, only one reference receive antenna may be configured, or multiple reference receive antennas may be configured. When multiple reference receive antennas are configured, second main-path interference cancellers and near-field interference cancellers need to be configured at a same quantity, so that the reference receive antennas, the second main-path interference cancellers, and the near-field interference cancellers are in a one-to-one correspondence, that is, one second main-path interference canceller is configured to cancel a main-path self-interference signal component (that is, a main-path interference signal) of a signal that is from only one reference receive antenna, and one near-field interference canceller is configured to cancel, based on a signal from only one reference receive antenna, a near-field interference signal component (that is, a near-field interference signal) corresponding to a signal that is from the main receive antenna.

Because functions and structures of the reference receive antennas are similar, functions and structures of the second main-path interference cancellers are similar, and functions and structures of the near-field interference cancellers are similar, in the following, a case in which only one reference receive antenna, one second main-path interference canceller, and one near-field interference canceller are configured is used as an example for description.

Optionally, the main receive antenna 120 and the reference receive antenna 140 are configured in parallel.

Specifically, correlation between self-interference signals (including a main-path reflected self-interference signal component and a near-field reflected self-interference component) in the first receive signal (received by the main receive antenna) and the second receive signal (received by the reference receive antenna) can be enhanced by configuring the reference receive antenna and the main receive antenna in parallel.

Optionally, a distance between the main receive antenna 120 and the reference receive antenna 140 is less than or equal to a first preset value, where the first preset value is determined according to a wavelength of the transmit signal.

Specifically, a propagation path of a signal (that is, a desired component in a receive signal) from a far-end communication peer end is relatively long, and the signal (a radio wave) experiences reflection and scattering for many times in a propagation process; therefore, for desired components in receive signals received by two or more antennas, correlation between the desired components is relatively small.

In addition, a propagation path of the near-field reflected self-interference component in the receive signal is relatively short; therefore, for two or more antennas that are relatively close to each other, correlation between near-field reflected self-interference components in signals received by the two or more antennas is relatively strong and relatively fixed.

It should be noted that, in this embodiment of the present invention, a distance between two antennas may be determined according to a proportion between the distance and a wavelength of a transmit signal, for example, if the distance between the two antennas is within once to twice the wavelength of the transmit signal, it may be determined that the distance between the two antenna is relatively short.

Therefore, according to the interference cancellation method in this embodiment of the present invention, the main receive antenna 120 and the reference receive antenna 140 are configured in parallel, and the distance between the main receive antenna 120 and the reference receive antenna 140 is relatively short (for example, 1 to 2 wavelengths apart), so that correlation between near-field reflected self-interference components in signals received by the main receive antenna and the reference receive antenna can be enhanced, thereby further improving an effect of near-field interference cancellation processing.

C. Splitter 110

Specifically, in this embodiment of the present invention, a coupler, a power splitter, or the like may be used as the splitter 110.

In addition, for example, a signal that has been processed by a transmit digital signal processing module, a digital-to-analog conversion module, an up-conversion module, and a power amplification module that are shown in FIG. 1 may be used as a to-be-transmitted signal and input to the splitter 110.

Therefore, the to-be-transmitted signal can be split into two signals by using the splitter 110, where one signal is used as the transmit signal and is transmitted to the transmit antenna through the first output end 112 of the splitter 110, and the other signal is used as the reference signal and is transmitted to the aftermentioned first main-path interference canceller 130 and second main-path interference canceller 150 through the second output end 114 of the splitter 110.

It should be noted that, in this embodiment of the present invention, the second output end 114 of the splitter 110 may be directly or indirectly connected to the first input end 134 of the first main-path interference canceller 130, and the second output end 114 of the splitter 110 may be directly or indirectly connected to the first input end 154 of the second main-path interference canceller 150.

For example, in this embodiment of the present invention, in a case in which an indirect connection is used, the splitter 110 may first send the reference signal to a splitter (including a coupler or a power splitter), and the splitter splits the reference signal into two signals, where one signal is sent to the first main-path interference canceller 130, and the other signal is sent to the second main-path interference canceller 150.

It should be understood that, the foregoing listed connection relationship between the splitter 110 and the first main-path interference canceller 130, and a connection relationship between the splitter 110 and the second main-path interference canceller 150 is merely an exemplary description, and the present invention is not limited thereto. Another implementation manner that can ensure that a reference signal is corresponding to a sending signal (for example, waveforms are the same or appropriately the same), and a reference signal input to the first main-path interference canceller 130 is corresponding to a reference signal input to the second main-path interference canceller 150 (for example, waveforms are the same or appropriately the same) falls within the protection scope of the present invention.

It should be noted that, in this embodiment of the present invention, power of the foregoing transmit signal and power of the foregoing reference signal may be the same or may be different, which is not limited in the present invention.

A coupler or a power splitter is used as the splitter 110, so that a waveform of the reference signal output by the splitter 110 is consistent with a waveform of the transmit signal output by the splitter 110, thereby facilitating aftermentioned main-path interference processing that is based on the reference signal.

It should be understood that, the foregoing listed coupler and power splitter that are used as the splitter 110 are merely an exemplary description, and the present invention is not limited thereto. Another apparatus that can ensure that a similarity between a waveform of a reference signal and a waveform of a transmit signal is within a preset range falls within the protection scope of the present invention.

In addition, in this embodiment of the present invention, a process of processing a signal by the transmit digital signal processing module, the digital-to-analog conversion module, the up-conversion module, and the power amplification module, and a process of transmitting the transmit signal by the transmit antenna are similar to those in the prior art. Herein, a description of the processes is omitted to avoid repetition.

D. First Main-Path Interference Canceller 130

Figure 4:
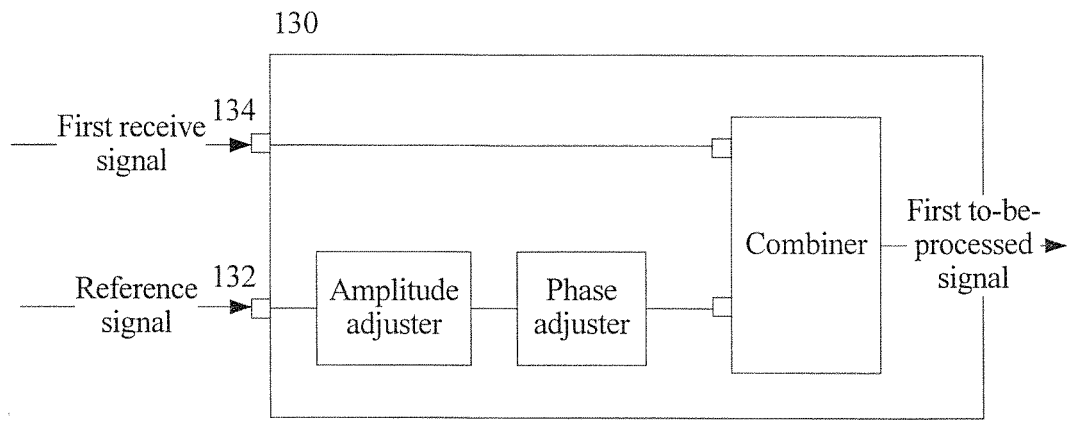
FIG. 4 is a schematic structural diagram of a first main-path interference canceller according to an embodiment of the present invention.

Specifically, as shown in FIG. 4, in this embodiment of the present invention, for example, the first main-path interference canceller 130 may include a phase adjuster, an amplitude adjuster, and a combiner. In addition, in this embodiment of the present invention, the first main-path interference canceller 130 has two input ends.

The second input end 132 (that is, an input port of the combiner) of the first main-path interference canceller 130 is connected to the output end of the main receive antenna 120, and a signal (that is, the first receive signal) that is input from the output end of the main receive antenna 120 through the second input end 132 is input to the input port of the combiner.

Optionally, the first main-path interference canceller (130) is specifically configured to perform amplitude adjustment processing and phase adjustment processing on the reference signal based on the first receive signal, so that amplitude of the reference signal is contrary to or approximately contrary to amplitude of a main-path interference signal in the first receive signal, and a phase of the reference signal is the same as or approximately the same as a phase of the main-path interference signal in the first receive signal; or perform amplitude adjustment processing and phase adjustment processing on the reference signal based on the first receive signal, so that amplitude of the reference signal is the same as or approximately the same as amplitude of a main-path interference signal in the first receive signal, and a difference between a phase of the reference signal and a phase of the main-path interference signal in the first receive signal is 180° or approximately 180°; and combine the first receive signal and a reference signal that is obtained after the amplitude adjustment processing and the phase adjustment processing.

Specifically, the first input end 134 of the first main-path interference canceller 130 is connected to the second output end 114 of the splitter 110, and a signal (that is, the reference signal) that is input from the second output end 114 of the splitter 110 through the first input end 134 is input to an adjusting circuit that is formed by connecting an amplitude adjuster and a phase adjuster in series, where the adjusting circuit is used to adjust amplitude and a phase of the signal in a manner of phase shifting, attenuation, and the like. For example, the amplitude of the reference signal may be enabled to be close to amplitude of a main-path self-interference signal component (that is, the main-path interference signal) in the foregoing first receive signal by means of attenuation, and certainly, the best effect is that the amplitude of the reference signal is the same as the amplitude of the main-path self-interference signal component in the foregoing first receive signal; however, because an error exists in an actual application, it is also acceptable that the amplitude of the reference signal is adjusted to be approximately the same as the amplitude of the main-path self-interference signal component in the foregoing first receive signal; in addition, the phase of the reference signal may be adjusted by means of phase shifting, to have a difference of 180° or approximately 180° from a phase of the first receive signal (which is specifically the main-path self-interference signal component in the first receive signal).

Alternatively, the amplitude of the reference signal may be enabled to be contrary to amplitude of a main-path self-interference signal component in the foregoing first receive signal by means of attenuation, and certainly, the best effect is that the amplitude of the reference signal is contrary to the amplitude of the main-path self-interference signal component in the foregoing first receive signal; however, because an error exists in an actual application, it is also acceptable that the amplitude of the reference signal is adjusted to be approximately contrary to the amplitude of the main-path self-interference signal component in the foregoing first receive signal; in addition, the phase of the reference signal may be adjusted by means of phase shifting, to be the same as or approximately the same as a phase of the first receive signal (which is specifically the main-path self-interference signal component in the first receive signal).

It should be noted that, "approximately" in this embodiment of the present invention may mean that a similarity between the two is within a preset range, where the preset range may be freely determined according to actual use and requirements, which is not specially limited in the present invention. A similar description is omitted in the following to avoid repetition unless otherwise specified.

Then, a reference signal that is obtained after amplitude and phase adjustment is input to another input port of the combiner, so that the combiner may combine (for example, add) the first receive signal and the reference signal that is obtained after the foregoing amplitude and phase adjustment, to cancel the main-path self-interference signal component in the first receive signal, and implement main-path interference cancellation processing on the first receive signal.

In this embodiment of the present invention, as an example instead of a limitation, an attenuator or the like may be used as the amplitude adjuster, and a delayer, a phase shifter, or the like may be used as the phase adjuster.

Therefore, the first processing signal output from the output end 136 (which is specifically an output end of the combiner) of the first main-path interference canceller 130 is a signal generated by canceling the main-path self-interference signal component from the first receive signal.

It should be noted that, in this embodiment of the present invention, the phase shifter and the attenuator may be adjusted, based on output of the foregoing combiner, in a manner of minimizing strength of the first processing signal output from the combiner. In addition, the foregoing listed manner of adjusting the phase shifter and the attenuator is merely an exemplary description, and the present invention is not limited thereto. An effect of interference cancellation can be implemented as long as strength of the first receive signal is reduced (or the strength of the first processing signal is less than strength of the first receive signal).

E. Second Main-Path Interference Canceller 150

Figure 5:
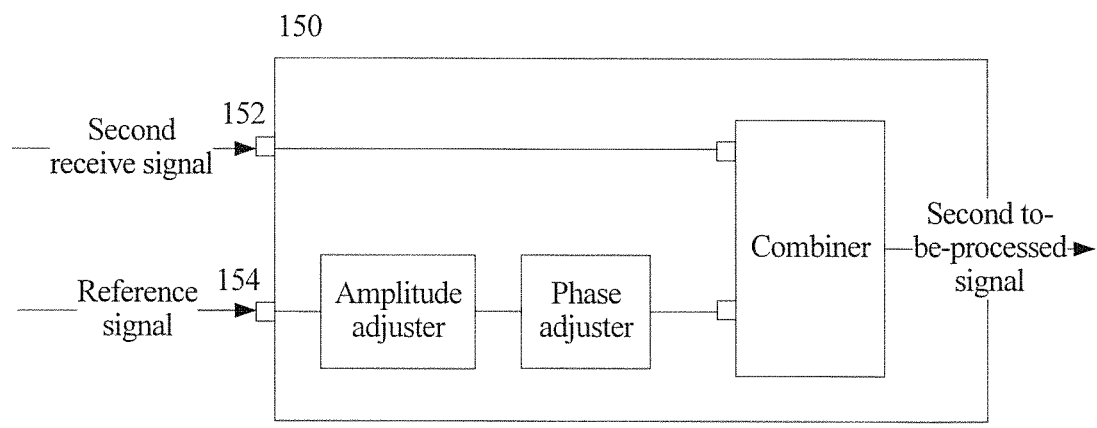
FIG. 5 is a schematic structural diagram of a second main-path interference canceller according to an embodiment of the present invention.

Specifically, as shown in FIG. 5, in this embodiment of the present invention, for example, the second main-path interference canceller 150 may include a phase adjuster, an amplitude adjuster, and a combiner. In addition, in this embodiment of the present invention, the second main-path interference canceller 150 has two input ends.

The second input end 152 (that is, an input port of the combiner) of the second main-path interference canceller 150 is connected to the output end of the reference receive antenna 140, and a signal (that is, the second receive signal) that is input from the output end of the reference receive antenna 140 through the second input end 152 is input to the input port of the combiner.

Optionally, the second main-path interference canceller (150) is specifically configured to perform amplitude adjustment processing and phase adjustment processing on the reference signal based on the second receive signal, so that the amplitude of the reference signal is contrary to or approximately contrary to amplitude of a main-path interference signal in the second receive signal, and the phase of the reference signal is the same as or approximately the same as a phase of the main-path interference signal in the second receive signal; or perform amplitude adjustment processing and phase adjustment processing on the reference signal based on the second receive signal, so that the amplitude of the reference signal is the same as or approximately the same as amplitude of a main-path interference signal in the second receive signal, and a difference between the phase of the reference signal and a phase of the main-path interference signal in the second receive signal is 180° or approximately 180°; and combine the second receive signal and a reference signal that is obtained after the amplitude adjustment processing and the phase adjustment processing.

Specifically, the first input end 154 of the second main-path interference canceller 150 is connected to the second output end 114 of the splitter 110, and a signal (that is, the reference signal) that is input from the second output end 114 of the splitter 110 through the first input end 154 is input to an adjusting circuit that is formed by connecting a phase adjuster and an amplitude adjuster in series, where the adjusting circuit is used to adjust amplitude and a phase of a signal in a manner of phase shifting, attenuation, and the like. For example, the amplitude of the reference signal may be enabled to be close to amplitude of a main-path self-interference signal component (that is, the main-path interference signal) in the foregoing second receive signal by means of attenuation, and certainly, the best effect is that the amplitude of the reference signal is the same as the amplitude of the main-path self-interference signal component in the foregoing second receive signal; however, because an error exists in an actual application, it is also acceptable that the amplitude of the reference signal is adjusted to be approximately the same as the amplitude of the main-path self-interference signal component in the foregoing second receive signal; in addition, the phase of the reference signal may be adjusted by means of phase shifting, to have a difference of 180° or approximately 180° from a phase of the second receive signal (which is specifically the main-path self-interference signal component in the second receive signal).

Alternatively, the amplitude of the reference signal may be enabled to be contrary to amplitude of a main-path self-interference signal component in the foregoing second receive signal by means of attenuation, and certainly, the best effect is that the amplitude of the reference signal is contrary to the amplitude of the main-path self-interference signal component in the foregoing second receive signal; however, because an error exists in an actual application, it is also acceptable that the amplitude of the reference signal is adjusted to be approximately contrary to the amplitude of the main-path self-interference signal component in the foregoing second receive signal; in addition, the phase of the reference signal may be adjusted by means of phase shifting, to be the same as or approximately the same as a phase of the second receive signal (which is specifically the main-path self-interference signal component in the second receive signal).

In this embodiment of the present invention, as an example instead of a limitation, an attenuator or the like may be used as the amplitude adjuster, and a delayer, a phase shifter, or the like may be used as the phase adjuster.

Then, a reference signal that is obtained after amplitude and phase adjustment is input to another input port of the combiner, so that the combiner may combine (for example, add) the second receive signal and the reference signal that is obtained after the foregoing amplitude and phase adjustment, to cancel the main-path self-interference signal component in the second receive signal, and implement main-path interference cancellation processing on the second receive signal.

It should be noted that, in this embodiment of the present invention, the phase shifter and the attenuator may be adjusted, based on output of the foregoing combiner, in a manner of minimizing strength of the second processing signal output from the combiner. In addition, the foregoing listed manner of adjusting the phase shifter and the attenuator is merely an exemplary description, and the present invention is not limited thereto. An effect of interference cancellation can be implemented as long as strength of the second receive signal is reduced (or the strength of the second processing signal is less than strength of the second receive signal).

In addition, in this embodiment of the present invention, a process of acquiring the second receive signal by the reference receive antenna may be similar to a process of receiving a signal by an antenna in the prior art. Herein, a description of the process is omitted to avoid repetition.

Therefore, the second processing signal output from the output end 156 (which is specifically an output end of the combiner) of the second main-path interference canceller 150 is a signal generated by canceling the main-path self-interference signal component from the second receive signal.

F. Near-Field Interference Canceller 160

Optionally, the near-field interference canceller 160 includes:

a first amplitude adjuster, configured to adjust amplitude of the second processing signal based on the first processing signal;

a first phase adjuster, configured to adjust a phase of the second processing signal based on the first processing signal; and a combiner, configured to combine the first processing signal and a second processing signal that has been processed by the first amplitude adjuster and the first phase adjuster.

Figure 6:
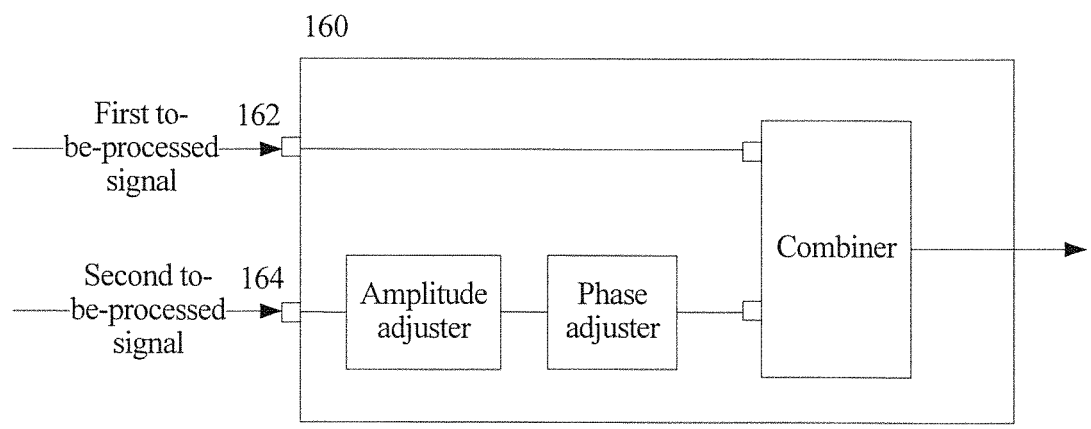
FIG. 6 is a schematic structural diagram of a near-field interference canceller according to an embodiment of the present invention.

Specifically, as shown in FIG. 6, in this embodiment of the present invention, the near-field interference canceller 160 may include one phase adjuster (the first amplitude adjuster), one amplitude adjuster (that is, the first phase adjuster), and the combiner. In addition, in this embodiment of the present invention, the near-field interference canceller 160 has two input ends.

The output end 136 of the first main-path interference canceller 130 is connected to the first input end 162 (that is, an input port of the combiner) of the near-field interference canceller 160, and a signal (that is, the first processing signal) that is input from the output end 136 of the first main-path interference canceller 130 through the first input end 162 is input to the input port of the combiner.

Optionally, the first amplitude adjuster is specifically configured to adjust the amplitude of the second processing signal based on the first processing signal, so that the amplitude of the second processing signal is contrary to or approximately contrary to amplitude of a first near-field interference signal in the first processing signal, and the second phase adjuster is specifically configured to adjust the phase of the second processing signal based on the first processing signal, so that the phase of the second processing signal is the same as or approximately the same as a phase of the first near-field interference signal in the first processing signal; or the second amplitude adjuster is specifically configured to adjust the amplitude of the second processing signal based on the first processing signal, so that the amplitude of the second processing signal is the same as or approximately the same as amplitude of a first near-field interference signal in the first processing signal, and the second phase adjuster is specifically configured to adjust the phase of the second processing signal based on the first processing signal, so that a difference between a phase of a first near-field interference signal in the second processing signal and a phase of the first processing signal is 180° or approximately 180°.

Specifically, the output end 156 of the second main-path interference canceller 150 is connected to the second input end 164 of the near-field interference canceller 160, and a signal (that is, the second processing signal) that is input from the output end 156 of the second main-path interference canceller 150 through the second input end 164 is input to an adjusting circuit that is formed by connecting a phase adjuster and an amplitude adjuster in series, where the adjusting circuit is used to adjust amplitude and a phase of a signal in a manner of phase shifting, attenuation, and the like. For example, the amplitude of the second processing signal may be enabled to be close to amplitude of a near-field self-interference signal component (that is, the first near-field interference signal, for example, the third delay component from the left in near-field reflected self-interference signal components shown in FIG. 2) in the foregoing first processing signal by means of attenuation, and certainly, the best effect is that the amplitude of the second processing signal is the same as the amplitude of the near-field self-interference signal component in the foregoing first processing signal; however, because an error exists in an actual application, it is also acceptable that the amplitude of the second processing signal is adjusted to be approximately the same as the amplitude of the near-field self-interference signal component in the foregoing first processing signal; in addition, the phase of the second processing signal may be adjusted by means of phase shifting, to have a difference of 180° or approximately 180° from a phase of the first processing signal (which is specifically the near-field self-interference signal component in the first processing signal).

Alternatively, the amplitude of the second processing signal may be enabled to be contrary to amplitude of a main-path self-interference signal component in the foregoing first processing signal by means of attenuation, and certainly, the best effect is that the amplitude of the second processing signal is contrary to the amplitude of the main-path self-interference signal component in the foregoing first processing signal; however, because an error exists in an actual application, it is also acceptable that the amplitude of the second processing signal is adjusted to be approximately contrary to the amplitude of the main-path self-interference signal component in the foregoing first processing signal; in addition, the phase of the second processing signal may be adjusted by means of phase shifting, to be the same as or approximately the same as a phase of the first processing signal (which is specifically the near-field self-interference signal component in the first processing signal).

Then, a second processing signal that is obtained after amplitude and phase adjustment is input to another input port of the combiner, so that the combiner may combine (for example, add) the first processing signal and the second processing signal that is obtained after the foregoing amplitude and phase adjustment, to cancel the near-field self-interference signal component in the first processing signal, and implement near-field interference cancellation processing on the first processing signal.

It should be noted that, in this embodiment of the present invention, the phase shifter and the attenuator may be adjusted, based on output of the foregoing combiner, in a manner of minimizing strength of the first processing signal output from the combiner. In addition, the foregoing listed manner of adjusting the phase shifter and the attenuator is merely an exemplary description, and the present invention is not limited thereto. An effect of interference cancellation can be implemented as long as the strength of the first processing signal is reduced.

Therefore, a signal output from an output end (which is specifically output of the combiner) of the near-field interference canceller 160 is a signal generated by canceling the near-field self-interference signal component from the first processing signal.

Optionally, the near-field interference canceller 160 further includes:

a delayer group, including at least one delayer, where the delayers are connected in series, and the delayer group is configured to acquire the second processing signal, and sequentially perform delay processing on the second processing signal by using each delayer;

an amplitude adjuster group, including at least one second amplitude adjuster, where the at least one second amplitude adjuster is in a one-to-one correspondence with the at least one delayer, and the second amplitude adjuster is configured to adjust, based on the first processing signal, amplitude of a second processing signal that is obtained after delay processing and that is output from a corresponding delayer;

a phase adjuster group, including at least one second phase adjuster, where the at least one second phase adjuster is in a one-to-one correspondence with the at least one delayer, and the second phase adjuster is configured to adjust, based on the first processing signal, a phase of the second processing signal that is obtained after delay processing and that is output from the corresponding delayer; and the combiner, specifically configured to combine the first processing signal and a processing signal that is obtained after the second processing signal that has been processed by the first amplitude adjuster and the first phase adjuster and a second processing signal that has been processed by the amplitude adjuster group and the phase adjuster group are combined.

Figure 2:
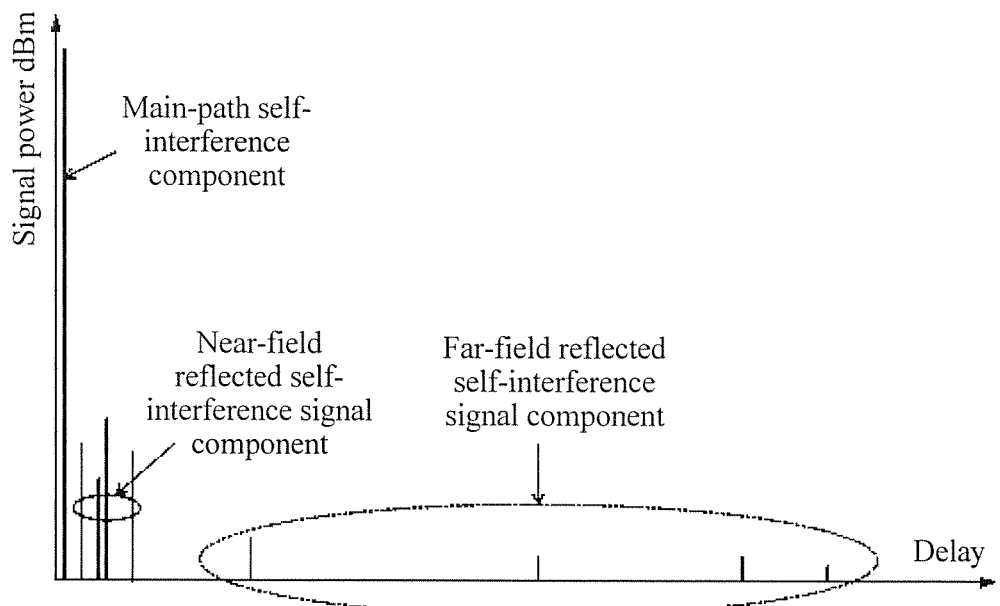
FIG. 2 is a schematic diagram of composition of a self-interference signal.

Specifically, as shown in FIG. 2, in a case in which near-field reflected self-interference signal components include multiple delay components, if only one amplitude adjuster (that is, the foregoing first amplitude adjuster) and one phase adjuster (that is, the foregoing phase adjuster) are configured, only one delay component in the near-field reflected self-interference signal components can be canceled. As shown in FIG. 2, four delay components exist in the near-field reflected self-interference signal components, if only one amplitude adjuster and one phase adjuster are configured, only a delay component, that is, the third delay component from the left in the near-field reflected self-interference signal components, with maximum strength (or energy) can be canceled.

Figure 7:
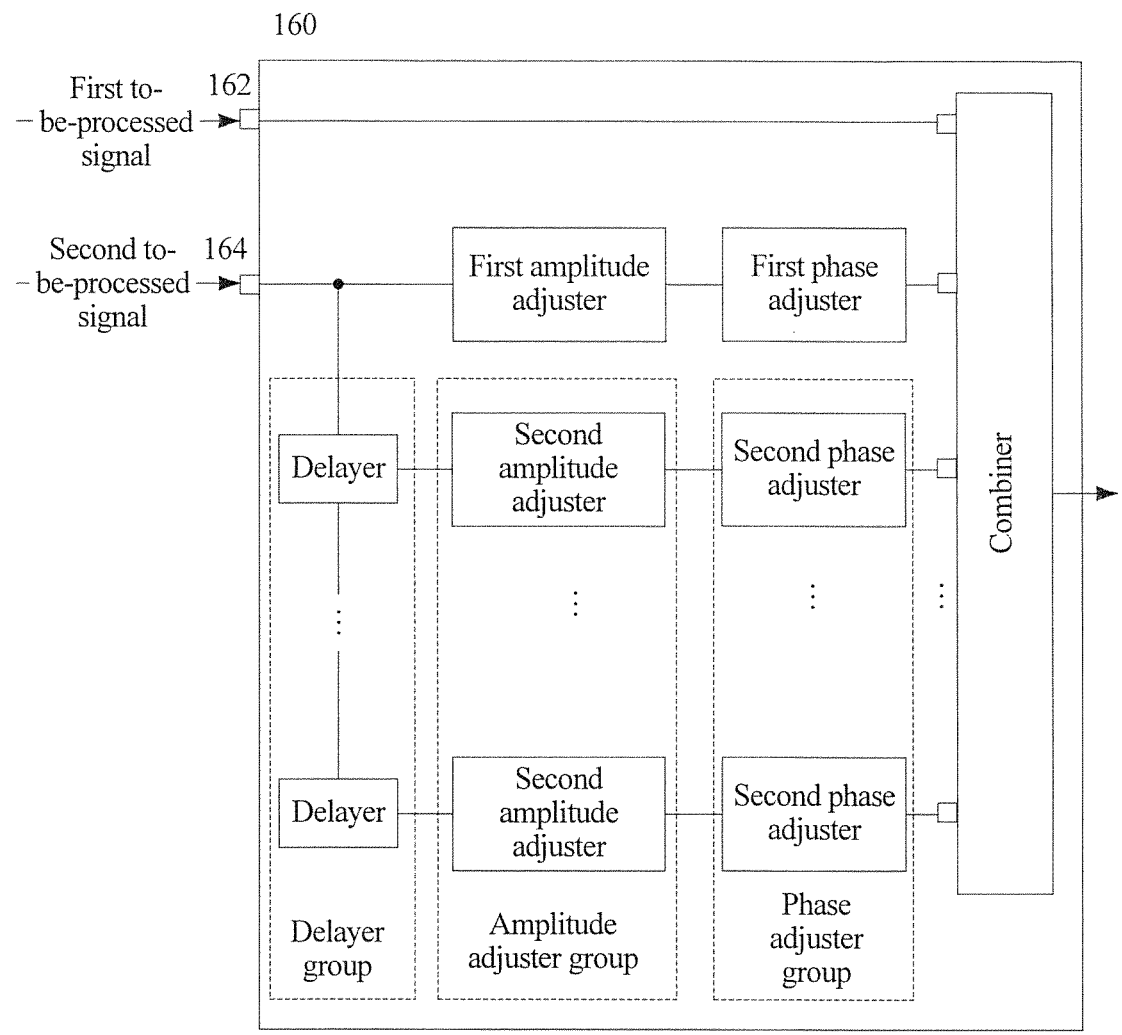
FIG. 7 is a schematic structural diagram of a near-field interference canceller according to another embodiment of the present invention.

In view of the foregoing problem, as shown in FIG. 7, in this embodiment of the present invention, the near-field interference canceller may include multiple tributaries, and one phase adjuster and one amplitude adjuster are arranged on each tributary.

In addition, in the near-field interference canceller, multiple delayers (for example, an analog delay line) connected in series are configured, and second processing signals are sequentially input to the delayers. For example, a second processing signal input to the first tributary may be a signal on which delay processing of a delayer is not performed, a second processing signal input to the second tributary may be a signal on which delay processing of one delayer is performed, and by analogy, a second processing signal input to the $N^{th}$ tributary may be a signal on which delay processing of N−1 delayers is performed; where a signal obtained after delay processing may be corresponding to a delay component in the near-field reflected self-interference signal components.

As shown in FIG. 7, a phase adjuster and an amplitude adjuster that are located at a same row form a tributary of the near-field interference canceller, or a phase adjuster and an amplitude adjuster that are located at a same row are corresponding to each other.

Optionally, the second amplitude adjuster is specifically configured to adjust, based on the first processing signal, the amplitude of the second processing signal that is obtained after delay processing and that is output from the corresponding delayer, so that the amplitude of the second processing signal is the same as or approximately the same as amplitude of a second near-field interference signal in the first processing signal; and the second phase adjuster is specifically configured to adjust, based on the first processing signal, the phase of the second processing signal that is obtained after delay processing and that is output from the corresponding delayer, so that a difference between the phase of the second processing signal and a phase of the second near-field interference signal in the first processing signal is 180° or approximately 180°.

Specifically, an amplitude adjuster and a phase adjuster in each tributary adjust amplitude and a phase of a signal in a manner of phase shifting, attenuation, and the like. For example, amplitude of a second processing signal obtained after a prescribed delay may be enabled to be close to amplitude of a corresponding delay component (that is, the second near-field interference signal) in the near-field self-interference signal component in the foregoing first processing signal by means of attenuation, and certainly, the best effect is that the amplitude of the second processing signal obtained after the prescribed delay is the same as the amplitude of the corresponding delay component in the near-field self-interference signal component in the foregoing first processing signal; however, because an error exists in an actual application, it is also acceptable that the amplitude of the second processing signal obtained after the prescribed delay is adjusted to be approximately the same as the amplitude of the corresponding delay component in the near-field self-interference signal component in the foregoing first processing signal; in addition, the phase of the second processing signal obtained after the prescribed delay may be adjusted by means of phase shifting, to have a difference of 180° or approximately 180° from a phase of the corresponding delay component in the near-field self-interference signal component in the foregoing first processing signal.

Optionally, the second amplitude adjuster is specifically configured to adjust, based on the first processing signal, the amplitude of the second processing signal that is obtained after delay processing and that is output from the corresponding delayer, so that the amplitude of the second processing signal is contrary to or approximately contrary to amplitude of a second near-field interference signal in the first processing signal; and the second phase adjuster is specifically configured to adjust, based on the first processing signal, the phase of the second processing signal that is obtained after delay processing and that is output from the corresponding delayer, so that the phase of the second processing signal is the same as or approximately the same as a phase of the second near-field interference signal in the first processing signal.

Specifically, the amplitude of the second processing signal obtained after the prescribed delay may be enabled to be contrary to the amplitude of the corresponding delay component (that is, the second near-field interference signal) in the near-field self-interference signal component in the foregoing first processing signal by means of attenuation, and certainly, the best effect is that the amplitude of the second processing signal obtained after the prescribed delay is contrary to the amplitude of the corresponding delay component in the near-field self-interference signal component in the foregoing first processing signal; however, because an error exists in an actual application, it is also acceptable that the amplitude of the second processing signal obtained after the prescribed delay is adjusted to be approximately contrary to the amplitude of the corresponding delay component in the near-field self-interference signal component in the foregoing first processing signal; in addition, the phase of the second processing signal obtained after the prescribed delay may be adjusted by means of phase shifting, to be the same as or approximately the same as the phase of the corresponding delay component in the near-field self-interference signal component in the foregoing first processing signal.

Then, each delay component of a second processing signal obtained after amplitude and phase adjustment is input to another input port of the combiner, so that the combiner may combine (for example, add) the first processing signal and each delay component of the second processing signal obtained after the foregoing amplitude and phase adjustment, to cancel each delay component of the near-field self-interference signal component in the first processing signal, and implement near-field interference cancellation processing on the first processing signal.

It should be understood that, the foregoing listed method and process of performing near-field interference cancellation processing on the first processing signal based on the second processing signal are merely an exemplary description, and the present invention is not limited thereto. For example, a phase shifter and an attenuator may also be adjusted, based on output of the foregoing combiner, in a manner of minimizing strength of the first processing signal output from the combiner. In addition, the foregoing listed manner of adjusting the phase shifter and the attenuator is merely an exemplary description, and the present invention is not limited thereto. An effect of interference cancellation can be implemented as long as the strength of the first processing signal is reduced.

According to the interference cancellation apparatus in this embodiment of the present invention, the near-field interference canceller has multiple tributaries, so that the multiple tributaries are respectively corresponding to multiple delay components in near-field self-interference signal components, and an effect of canceling the near-field self-interference signal components can be further improved.

It should be noted that, an embodiment in which one reference antenna is configured is listed in the foregoing embodiments. For example, when N reference antennas are configured, N second main-path interference cancellers and N near-field interference cancellers may be configured, where one reference antenna, one second main-path interference canceller, and one near-field interference canceller form one interference cancellation tributary, a second main-path interference canceller in a same tributary is configured to cancel a main-path interference component in a receive signal that is from a reference antenna in the tributary, and a near-field interference canceller in the same tributary is configured to cancel a near-field interference component in the receive signal that is from the reference antenna in the tributary.

According to the interference cancellation apparatus in this embodiment of the present invention, a reference receive antenna is arranged, and main-path interference cancellation processing is performed on a first receive signal received by a main receive antenna and a second receive signal received by the reference receive antenna, to cancel main-path self-interference signal components in the first receive signal and the second receive signal; a near-field interference canceller performs, by using a second receive signal whose main-path self-interference signal component has been canceled, near-field interference cancellation processing on a first receive signal whose main-path self-interference signal component has been canceled, so that cancellation of a near-field reflected self-interference component in the first receive signal can be implemented.

In the foregoing description, the interference cancellation apparatus in this embodiment of the present invention is described in detail with reference to FIG. 1 to FIG. 7, and in the following, an interference cancellation method in an embodiment of the present invention is described in detail with reference to FIG. 8.

Figure 8:
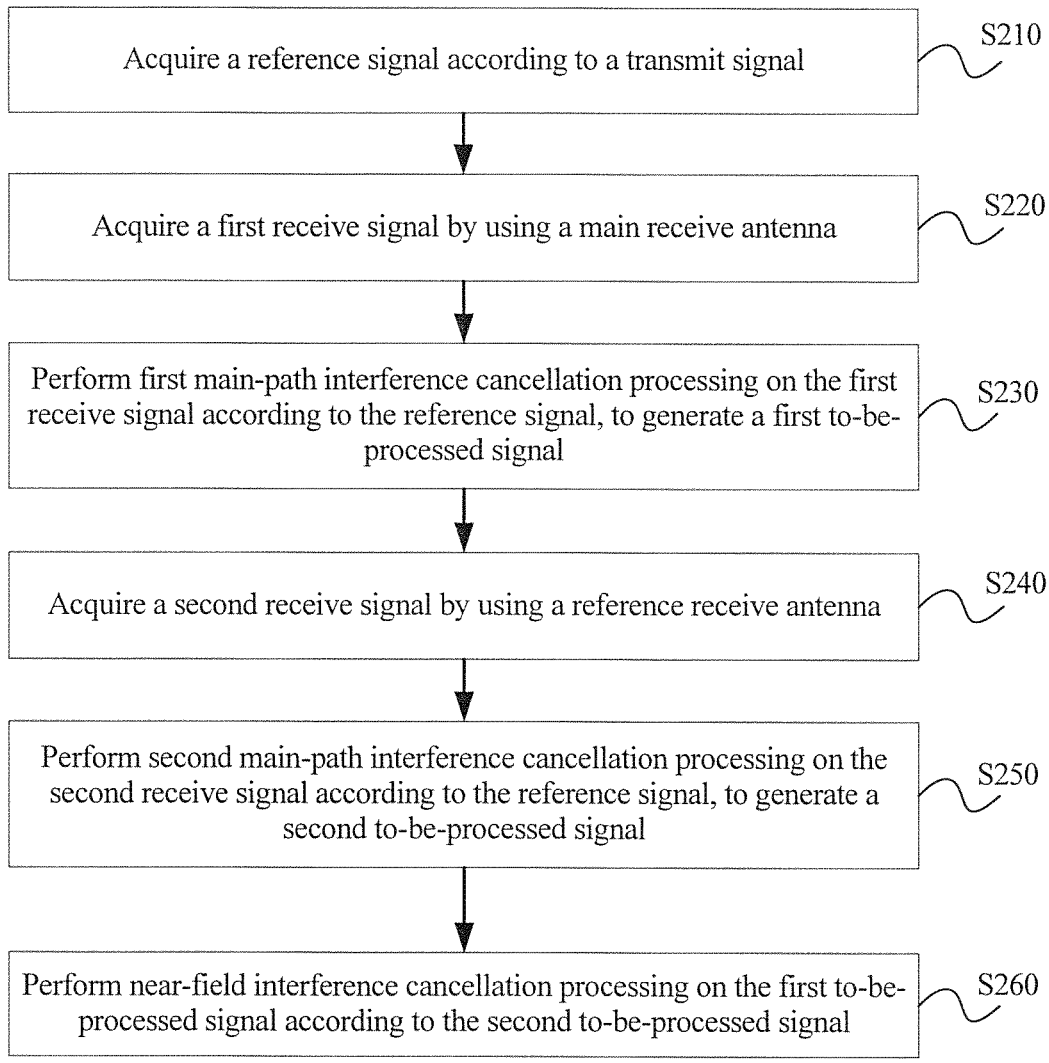
FIG. 8 is a schematic flowchart of an interference cancellation method according to an embodiment of the present invention.

FIG. 8 shows a schematic flowchart of an interference cancellation method 200 according to an embodiment of the present invention, where the method 200 is performed by a communications device including a main receive antenna and at least one reference receive antenna. As shown in FIG. 8, the method 200 includes:

S210. Acquire a reference signal according to a transmit signal.

S220. Acquire a first receive signal by using the main receive antenna.

S230. Perform first main-path interference cancellation processing on the first receive signal according to the reference signal, to generate a first processing signal.

S240. Acquire a second receive signal by using the reference receive antenna.

S250. Perform second main-path interference cancellation processing on the second receive signal according to the reference signal, to generate a second processing signal.

S260. Perform near-field interference cancellation processing on the first processing signal according to the second processing signal.

Specifically, in S210, for example, a signal that has been processed by a transmit digital signal processing module, a digital-to-analog conversion module, an up-conversion module, and a power amplification module in FIG. 1 may be used as a to-be-transmitted signal and input to a coupler, a power splitter, or the like.

Therefore, the to-be-transmitted signal can be split into two signals by using the coupler or the power splitter, where one signal is used as the transmit signal and is transmitted to a transmit antenna, and the other signal is used as the reference signal.

It should be noted that, in this embodiment of the present invention, power of the foregoing transmit signal and power of the foregoing reference signal may be the same or may be different, which is not specially limited in the present invention.

Optionally, the acquiring a reference signal according to a transmit signal includes:

determining the reference signal according to a waveform of the transmit signal, so that a similarity between a waveform of the reference signal and the waveform of the transmit signal is within a preset range.

Specifically, acquiring the reference signal and the transmit signal by using the coupler or the power splitter can ensure that the waveforms of the reference signal and the transmit signal are consistent, and that the waveforms are consistent includes: the waveform of the reference signal is the same as the waveform of the transmit signal or the similarity is within a preset range, thereby facilitating after-mentioned main-path interference processing that is based on the reference signal.

It should be understood that, the foregoing listed method of acquiring the reference signal by using the coupler and the power splitter is merely an exemplary description, and the present invention is not limited thereto. Another apparatus that can ensure that the similarity between the waveform of the reference signal and the waveform of the transmit signal is within the preset range falls within the protection scope of the present invention.

In addition, in this embodiment of the present invention, a process of processing a signal by the transmit digital signal processing module, the digital-to-analog conversion module, the up-conversion module, and the power amplification module, and a process of transmitting the transmit signal by the transmit antenna are similar to those in the prior art. Herein, a description of the processes is omitted to avoid repetition.

In S220, a signal may be received by using the main receive antenna, and the received signal is used as the first receive signal, where a process of receiving the signal by the main receive antenna may be similar to a process of receiving a signal by an antenna in the prior art. Herein, a description of the process is omitted to avoid repetition.

Optionally, the performing first main-path interference cancellation processing on the first receive signal according to the reference signal includes:

performing amplitude adjustment processing and phase adjustment processing on the reference signal based on the first receive signal, so that amplitude of the reference signal is contrary to or approximately contrary to amplitude of a main-path interference signal in the first receive signal, and a phase of the reference signal is the same as or approximately the same as a phase of the main-path interference signal in the first receive signal; or performing amplitude adjustment processing and phase adjustment processing on the reference signal based on the first receive signal, so that amplitude of the reference signal is the same as or approximately the same as amplitude of a main-path interference signal in the first receive signal, and a difference between a phase of the reference signal and a phase of the main-path interference signal in the first receive signal is 180° or approximately 180°.

In this embodiment of the present invention, for example, an adjusting circuit formed by connecting a phase adjuster and an amplitude adjuster in series may be used. Therefore, in S230, the amplitude and the phase of the reference signal may be adjusted by using the adjusting circuit in a manner of phase shifting, attenuation, and the like. For example, the amplitude of the reference signal may be enabled to be close to amplitude of a main-path self-interference signal component in the foregoing first receive signal by means of attenuation, and certainly, the best effect is the amplitude of the reference signal is the same as the amplitude of the main-path self-interference signal component in the foregoing first receive signal; however, because an error exists in an actual application, it is also acceptable that the amplitude of the reference signal is adjusted to be approximately the same as the amplitude of the main-path self-interference signal component in the foregoing first receive signal; in addition, the phase of the reference signal may be adjusted by means of phase shifting, to be contrary to or approximately contrary to a phase of the main-path self-interference signal component (that is, the main-path interference signal) in the first receive signal.

Then, a reference signal obtained after amplitude adjustment and phase adjustment may be combined (for example, added) with the first receive signal, to cancel the main-path self-interference signal component in the first receive signal, and implement main-path interference cancellation processing on the first receive signal, and a signal obtained after processing is used as the first processing signal.

In this embodiment of the present invention, as an example instead of a limitation, an attenuator or the like may be used as the amplitude adjuster, and a delayer, a phase shifter, or the like may be used as the phase adjuster.

It should be understood that, the foregoing listed method and process of performing main-path interference cancellation processing on the first receive signal based on the reference signal are merely an exemplary description, and the present invention is not limited thereto. For example, the phase shifter and the attenuator may also be adjusted in a manner of minimizing strength of the first processing signal.

In S240, a signal may be received by using the reference receive antenna, and the received signal is used as the second receive signal, where a process of receiving the signal by the reference receive antenna may be similar to a process of receiving a signal by an antenna in the prior art. Herein, a description of the process is omitted to avoid repetition.

It should be noted that, in this embodiment of the present invention, only one reference receive antenna may be configured, or multiple reference receive antennas may be configured. When multiple reference receive antennas are configured, main-path self-interference signal components in signals from the reference receive antennas are separately canceled, and a corresponding near-field interference signal component in a signal from the main receive antenna is canceled based on a signal from each reference receive antenna (a detailed description is provided subsequently).

Because functions and structures of the reference receive antennas are similar, processes and methods of canceling the main-path self-interference signal components in the signals from the reference receive antennas are similar, and processes and methods of canceling corresponding near-field interference signal components in signals from main receive antennas based on the signals from the reference receive antennas are similar. A case in which only one reference receive antenna is configured is used as an example for description in the following.

Optionally, the main receive antenna and the reference receive antenna are configured in parallel.

In addition, optionally, a distance between the main receive antenna and the reference receive antenna is less than or equal to a first preset value, where the first preset value is determined according to a wavelength of the transmit signal.

Specifically, a propagation path of a signal (that is, a desired component in a receive signal) from a far-end communication peer end is relatively long, and the signal (a radio wave) experiences reflection and scattering for many times in a propagation process; therefore, for desired components in receive signals received by two or more antennas, correlation between the desired components is relatively small.

In addition, a propagation path of a near-field reflected self-interference component in the receive signal is relatively short; therefore, for two or more antennas that are relatively close to each other, correlation between near-field reflected self-interference components in signals received by the two or more antennas is relatively strong and relatively fixed.

It should be noted that, in this embodiment of the present invention, a distance between two antennas may be determined according to a proportion between the distance and a wavelength of a transmit signal, for example, if the distance between the two antennas is within once to twice the wavelength of the transmit signal, it may be determined that the distance between the two antenna is relatively short.

Therefore, according to the interference cancellation method in this embodiment of the present invention, a main receive antenna and a reference receive antenna are configured in parallel, and a distance between the main receive antenna and the reference receive antenna is relatively short, so that correlation between near-field reflected self-interference components in signals received by the main receive antenna and reference receive antenna can be enhanced, thereby further improving an effect of near-field interference cancellation processing.

Optionally, the performing second main-path interference cancellation processing on the second receive signal according to the reference signal includes:

performing amplitude adjustment processing and phase adjustment processing on the reference signal based on the second receive signal, so that the amplitude of the reference signal is contrary to or approximately contrary to amplitude of a main-path interference signal in the second receive signal, and the phase of the reference signal is the same as or approximately the same as a phase of the main-path interference signal in the second receive signal; or performing amplitude adjustment processing and phase adjustment processing on the reference signal based on the second receive signal, so that the amplitude of the reference signal is the same as or approximately the same as amplitude of the second receive signal, and a difference between the phase of the reference signal and a phase of the second receive signal is 180° or approximately 180°.

In S250, the amplitude and the phase of the reference signal may be adjusted by using the adjusting circuit in a manner of phase shifting, attenuation, and the like. For example, the amplitude of the reference signal may be enabled to be close to amplitude of a main-path self-interference signal component in the foregoing second receive signal by means of attenuation, and certainly, the best effect is the amplitude of the reference signal is the same as the amplitude of the main-path self-interference signal component in the foregoing second receive signal; however, because an error exists in an actual application, it is also acceptable that the amplitude of the reference signal is adjusted to be approximately the same as the amplitude of the main-path self-interference signal component in the foregoing second receive signal; in addition, the phase of the reference signal may be adjusted by means of phase shifting, to have a difference of 180° or approximately 180° from a phase of the main-path self-interference signal component (that is, the main-path interference signal) in the second receive signal.

A reference signal after amplitude adjustment and phase adjustment may be combined (for example, added) with the second receive signal, to cancel the main-path self-interference signal component in the second receive signal, and implement main-path interference cancellation processing on the second receive signal, and a processing signal is used as the second processing signal.

In this embodiment of the present invention, as an example instead of a limitation, an attenuator or the like may be used as the amplitude adjuster, and a delayer, a phase shifter, or the like may be used as the phase adjuster.

It should be understood that, the foregoing listed method and process of performing main-path interference cancellation processing on the second receive signal based on the reference signal are merely an exemplary description, and the present invention is not limited thereto. For example, the phase shifter and the attenuator may also be adjusted in a manner of minimizing strength of the second processing signal.

Therefore, in S260, a near-field reflected self-interference signal component in the first processing signal may be canceled based on the foregoing obtained second processing signal.

Optionally, the performing amplitude adjustment processing and phase adjustment processing on the second processing signal based on the first processing signal includes:

adjusting amplitude of the second processing signal based on the first processing signal, so that the amplitude of the second processing signal is contrary to or approximately contrary to amplitude of a first near-field interference signal in the first processing signal; and adjusting a phase of the second processing signal based on the first processing signal, so that the phase of the second processing signal is the same as or approximately the same as a phase of the first near-field interference signal in the first processing signal; or adjusting amplitude of the second processing signal based on the first processing signal, so that the amplitude of the second processing signal is the same as or approximately the same as amplitude of a first near-field interference signal in the first processing signal; and adjusting a phase of the second processing signal based on the first processing signal, so that a difference between the phase of the second processing signal and a phase of the first near-field interference signal in the first processing signal is 180° or approximately 180°.

Specifically, in this embodiment of the present invention, adjustment is performed on the amplitude and the phase of the second processing signal. For example, the amplitude of the second processing signal may be enabled to be close to amplitude of a near-field self-interference signal component (that is, the first near-field interference signal) in the foregoing first processing signal by means of attenuation, and certainly, the best effect is that the amplitude of the second processing signal is the same as the amplitude of the near-field self-interference signal component in the foregoing first processing signal; however, because an error exists in an actual application, it is also acceptable that the amplitude of the second processing signal is adjusted to be approximately the same as the amplitude of the near-field self-interference signal component in the foregoing first processing signal; in addition, the phase of the second processing signal may be adjusted by means of phase shifting, to have a difference of 180° or approximately 180° from a phase of the near-field self-interference signal component in the first processing signal.

Then, the first processing signal may be combined (for example, added) with a second processing signal that is obtained after the foregoing amplitude and phase adjustment, to cancel the near-field self-interference signal component in the first processing signal, and implement near-field interference cancellation processing on the first processing signal.

In addition, the foregoing listed method of canceling the near-field self-interference signal component in the first processing signal by using the second processing signal is merely an exemplary description, and the present invention is not limited thereto. For example, the phase and amplitude of the second processing signal may also be adjusted in a manner of minimizing strength of a first processing signal that has been combined with the second processing signal.

Optionally, the performing near-field interference cancellation processing on the first processing signal according to the second processing signal includes:

performing amplitude adjustment processing and phase adjustment processing on the second processing signal based on the first processing signal, to generate a third processing signal;

performing delay processing on the second processing signal at least once, to generate at least one fourth processing signal;

separately performing amplitude adjustment processing and phase adjustment processing on the at least one fourth processing signal based on the first processing signal, to generate at least one fifth processing signal, where the at least one fourth processing signal is in a one-to-one correspondence with the at least one fifth processing signal; and combining the at least one fifth processing signal, the third signal, and the first processing signal.

Specifically, in a case in which the near-field reflected self-interference signal component includes multiple delay components, delay may be performed on the second processing signal for N−1 times by using N−1 delayers (for example, an analog delay line), and N tributaries are arranged, where one phase adjuster and one amplitude adjuster are arranged on each tributary.

In addition, a second processing signal input to the first tributary may be a signal on which delay processing of a delayer is not performed, a second processing signal input to the second tributary may be a signal on which delay processing of one delayer is performed, and by analogy, a second processing signal input to the $N^{th}$ tributary may be a signal on which delay processing of N−1 delayers is performed.

Optionally, the separately performing amplitude adjustment processing and phase adjustment processing on the at least one fourth processing signal based on the first processing signal includes:

adjusting amplitude of the fourth processing signal based on the first processing signal, so that the amplitude of the fourth processing signal is contrary to or approximately contrary to amplitude of a second near-field interference signal in the first processing signal; and adjusting a phase of the second processing signal based on the first processing signal, so that the phase of the second processing signal is the same as or approximately the same as a phase of the second near-field interference signal in the first processing signal.

Alternatively, the separately performing amplitude adjustment processing and phase adjustment processing on the at least one fourth processing signal based on the first processing signal includes:

adjusting amplitude of the fourth processing signal based on the first processing signal, so that the amplitude of the second processing signal is the same as or approximately the same as amplitude of a second near-field interference signal in the first processing signal; and adjusting a phase of the fourth processing signal based on the first processing signal, so that a difference between the phase of the second processing signal and a phase of the second near-field interference signal in the first processing signal is 180° or approximately 180°.

Specifically, an amplitude adjuster and a phase adjuster in each tributary perform adjustment on amplitude and a phase of an input signal in a manner of phase shifting, attenuation, and the like. For example, amplitude of a second processing signal obtained after a prescribed delay may be enabled to be close to amplitude of a corresponding delay component (that is, the second near-field interference signal) in the near-field self-interference signal component in the foregoing first processing signal by means of attenuation, and certainly, the best effect is that the amplitude of the second processing signal obtained after the prescribed delay is the same as the amplitude of the corresponding delay component in the near-field self-interference signal component in the foregoing first processing signal; however, because an error exists in an actual application, it is also acceptable that the amplitude of the second processing signal obtained after the prescribed delay is adjusted to be approximately the same as the amplitude of the corresponding delay component in the near-field self-interference signal component in the foregoing first processing signal; in addition, a phase of the second processing signal obtained after the prescribed delay may be adjusted by means of phase shifting, to have a difference of 180° or approximately 180° from a phase of the corresponding delay component in the first processing signal (which is specifically the near-field self-interference signal component in the first processing signal).

Then, the first processing signal is combined (for example, added) with each delay component of a second processing signal obtained after the foregoing amplitude adjustment and phase adjustment, to cancel each delay component of the near-field self-interference signal component in the first processing signal, and implement near-field interference cancellation processing on the first processing signal.

According to the interference cancellation method in this embodiment of the present invention, delay processing is performed on a second processing signal for multiple times, which can ensure that multiple delay components of the second processing signal are corresponding to multiple near-field self-interference signal components in a first processing signal, and can further improve an effect of canceling the near-field self-interference signal components.

According to the interference cancellation method in this embodiment of the present invention, a reference receive antenna is arranged, and main-path interference cancellation processing is performed on a first receive signal received by a main receive antenna and a second receive signal received by the reference receive antenna, to cancel main-path self-interference signal components in the first receive signal and the second receive signal; a near-field interference canceller performs, by using a second receive signal whose main-path self-interference signal component has been canceled, near-field interference cancellation processing on a first receive signal whose main-path self-interference signal component has been canceled, so that cancellation of a near-field reflected self-interference component in the first receive signal can be implemented.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be noted that, an embodiment in which "add" is used as "combination" is listed in the foregoing, and the present invention is not limited thereto. Change is performed according to adjustment states of amplitude and phase, for example, if amplitude and a phase of a reference signal are adjusted to be the same as that of an interference signal, cancellation may also be performed on the reference signal and the interference signal in a manner of "subtraction".

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interference cancellation apparatus, wherein the apparatus comprises:
a splitter configured to:
acquire a reference signal according to a transmit signal, and
send the reference signal to a first main-path interference canceller and a second main-path interference canceller;
a main receive antenna configured to:
receive a first receive signal, and
send the first receive signal to the first main-path interference canceller;
the first main-path interference canceller configured to:
perform amplitude adjustment processing and phase adjustment processing on the reference signal based on the first receive signal, so that amplitude of the reference signal is contrary to or approximately contrary to amplitude of a main-path interference signal in the first receive signal, and a phase of the reference signal is the same as or approximately the same as a phase of the main-path interference signal in the first receive signal,
combine the first receive signal and a reference signal that is obtained after the amplitude adjustment processing and the phase adjustment processing,
generate a first processing signal, and
send the first processing signal to a near-field interference canceller;
a reference receive antenna configured to:
receive a second receive signal, and
send the second receive signal to the second main-path interference canceller;
the second main-path interference canceller configured to:
perform second main-path interference cancellation processing on the second receive signal according to the reference signal,
generate a second processing signal, and
send the second processing signal to the near-field interference canceller; and
the near-field interference canceller configured to:
perform near-field interference cancellation processing on the first processing signal according to the second processing signal.

2. The apparatus according to claim 1, wherein the main receive antenna and the reference receive antenna are configured in parallel.

3. The apparatus according to claim 2, wherein a distance between the main receive antenna and the reference receive antenna is less than or equal to a first preset value, and the first preset value is determined according to a wavelength of the transmit signal.

4. The apparatus according to claim 1, wherein the second main-path interference canceller is configured to:
perform amplitude adjustment processing and phase adjustment processing on the reference signal based on the second receive signal, so that the amplitude of the reference signal is contrary to or approximately contrary to amplitude of a main-path interference signal in the second receive signal, and the phase of the reference signal is the same as or approximately the same as a phase of the main-path interference signal in the second receive signal, or perform amplitude adjustment processing and phase adjustment processing on the reference signal based on the second receive signal, so that the amplitude of the reference signal is the same as or approximately the same as amplitude of a main-path interference signal in the second receive signal, and a difference between the phase of the reference signal and a phase of the main-path interference signal in the second receive signal is 180° or approximately 180°; and
combine the second receive signal and a reference signal that is obtained after the amplitude adjustment processing and the phase adjustment processing.

5. The apparatus according to claim 1, wherein the near-field interference canceller comprises:
a first amplitude adjuster, configured to adjust amplitude of the second processing signal based on the first processing signal;
a first phase adjuster, configured to adjust a phase of the second processing signal based on the first processing signal; and
a combiner, configured to combine the first processing signal and a second processing signal that has been processed by the first amplitude adjuster and the first phase adjuster.

6. The apparatus according to claim 5, wherein:
the first amplitude adjuster is configured to:
adjust the amplitude of the second processing signal based on the first processing signal, so that the amplitude of the second processing signal is contrary to or approximately contrary to amplitude of a first near-field interference signal in the first processing signal, and
the first phase adjuster is configured to:
adjust the phase of the second processing signal based on the first processing signal, so that the phase of the second processing signal is the same as or approximately the same as a phase of the first near-field interference signal in the first processing signal; or
the first amplitude adjuster is configured to:
adjust the amplitude of the second processing signal based on the first processing signal, so that the amplitude of the second processing signal is the same as or approximately the same as amplitude of a first near-field interference signal in the first processing signal, and
the first phase adjuster is configured to:
adjust the phase of the second processing signal based on the first processing signal, so that a difference between the phase of the second processing signal and a phase of the first near-field interference signal in the first processing signal is 180° or approximately 180°.

7. The apparatus according to claim 5, wherein the near-field interference canceller further comprises:
a delayer group, comprising at least one delayer, wherein the at least one delayer is connected in series, and the delayer group is configured to acquire the second processing signal, and sequentially perform delay processing on the second processing signal by using each delayer,
an amplitude adjuster group, comprising at least one second amplitude adjuster, wherein the at least one second amplitude adjuster is in a one-to-one correspondence with the at least one delayer, and the second amplitude adjuster is configured to adjust, based on the first processing signal, amplitude of a second processing signal that is obtained after delay processing and that is output from a corresponding delayer; and a phase adjuster group, comprising at least one second phase adjuster, wherein the at least one second phase adjuster is in a one-to-one correspondence with the at least one delayer, and the second phase adjuster is configured to adjust, based on the first processing signal, a phase of the second processing signal that is obtained after delay processing and that is output from the corresponding delayer;

wherein the combiner is configured to combine the first processing signal and a processing signal that is obtained after the second processing signal that has been processed by the first amplitude adjuster and the first phase adjuster and a second processing signal that has been processed by the amplitude adjuster group and the phase adjuster group are combined.

8. The apparatus according to claim 7, wherein:
the second amplitude adjuster is configured to:
adjust, based on the first processing signal, the amplitude of the second processing signal that is obtained after delay processing and that is output from the corresponding delayer, so that the amplitude of the second processing signal is contrary to or approximately contrary to amplitude of a second near-field interference signal in the first processing signal; and
the second phase adjuster is configured to:
adjust, based on the first processing signal, the phase of the second processing signal that is obtained after delay processing and that is output from the corresponding delayer, so that the phase of the second processing signal is the same as or approximately the same as a phase of the second near-field interference signal in the first processing signal.

9. The apparatus according to claim 7, wherein:
the second amplitude adjuster is configured to:
adjust, based on the first processing signal, the amplitude of the second processing signal that is obtained after delay processing and that is output from the corresponding delayer, so that the amplitude of the second processing signal is the same as or approximately the same as amplitude of a second near-field interference signal in the first processing signal; and
the second phase adjuster is configured to:
adjust, based on the first processing signal, the phase of the second processing signal that is obtained after delay processing and that is output from the corresponding delayer, so that a difference between the phase of the second processing signal and a phase of the second near-field interference signal in the first processing signal is 180° or approximately 180°.

10. An interference cancellation method, wherein the method is performed in a device comprising a main receive antenna and at least one reference receive antenna, the method comprising:
acquiring a reference signal according to a transmit signal;
acquiring a first receive signal using the main receive antenna;
performing amplitude adjustment processing and phase adjustment processing on the reference signal based on the first receive signal, so that amplitude of the reference signal is contrary to or approximately contrary to amplitude of a main-path interference signal in the first receive signal, and a phase of the reference signal is the same as or approximately the same as a phase of the main-path interference signal in the first receive signal;

generating a first processing signal;
acquiring a second receive signal using the reference receive antenna;
performing second main-path interference cancellation processing on the second receive signal, according to the reference signal, to generate a second processing signal; and
performing near-field interference cancellation processing on the first processing signal according to the second processing signal.

11. The method according to claim 10, wherein the main receive antenna and the reference receive antenna are configured in parallel.

12. The method according to claim 11, wherein a distance between the main receive antenna and the reference receive antenna is less than or equal to a first preset value, and the first preset value is determined according to a wavelength of the transmit signal.

13. The method according to claim 10, wherein performing the second main-path interference cancellation processing on the second receive signal according to the reference signal comprises:
performing amplitude adjustment processing and phase adjustment processing on the reference signal based on the second receive signal, so that the amplitude of the reference signal is contrary to or approximately contrary to amplitude of a main-path interference signal in the second receive signal, and the phase of the reference signal is the same as or approximately the same as a phase of the main-path interference signal in the second receive signal, or
performing amplitude adjustment processing and phase adjustment processing on the reference signal based on the second receive signal, so that the amplitude of the reference signal is the same as or approximately the same as amplitude of a main-path interference signal in the second receive signal, and a difference between the phase of the reference signal and a phase of a main-path interference signal in the second receive signal is 180° or approximately 180°.

14. The method according to claim 10, wherein performing the near-field interference cancellation processing on the first processing signal according to the second processing signal comprises:
performing amplitude adjustment processing and phase adjustment processing on the second processing signal based on the first processing signal; and
combining the first processing signal and a second processing signal that is obtained after the amplitude adjustment processing and the phase adjustment processing.

15. The method according to claim 14, wherein performing the amplitude adjustment processing and phase adjustment processing on the second processing signal based on the first processing signal comprises:
adjusting amplitude of the second processing signal based on the first processing signal, so that the amplitude of the second processing signal is contrary to or approximately contrary to amplitude of a first near-field interference signal in the first processing signal, and
adjusting a phase of the second processing signal based on the first processing signal, so that the phase of the second processing signal is the same as or approximately the same as a phase of the first near-field interference signal in the first processing signal; or
adjusting amplitude of the second processing signal based on the first processing signal, so that the amplitude of the second processing signal is the same as or approximately the same as amplitude of a first near-field interference signal in the first processing signal, and adjusting a phase of the second processing signal based on the first processing signal, so that a difference between the phase of the second processing signal and a phase of the first near-field interference signal in the first processing signal is 180° or approximately 180°.

16. The method according to claim 14, wherein performing the near-field interference cancellation processing on the first processing signal according to the second processing signal comprises:

performing amplitude adjustment processing and phase adjustment processing on the second processing signal based on the first processing signal, to generate a third processing signal;

performing delay processing on the second processing signal at least once, to generate at least one fourth processing signal;

separately performing amplitude adjustment processing and phase adjustment processing on the at least one fourth processing signal based on the first processing signal, to generate at least one fifth processing signal, wherein the at least one fourth processing signal is in a one-to-one correspondence with the at least one fifth processing signal; and combining the at least one fifth processing signal, the third processing signal, and the first processing signal.

17. The method according to claim 16, wherein separately performing the amplitude adjustment processing and phase adjustment processing on the at least one fourth processing signal based on the first processing signal comprises:

adjusting amplitude of the fourth processing signal based on the first processing signal, so that the amplitude of the fourth processing signal is contrary to or approximately contrary to amplitude of a second near-field interference signal in the first processing signal; and adjusting a phase of the fourth processing signal based on the first processing signal, so that the phase of the second processing signal is the same as or approximately the same as a phase of the second near-field interference signal in the first processing signal.

18. The method according to claim 16, wherein separately performing the amplitude adjustment processing and phase adjustment processing on the at least one fourth processing signal based on the first processing signal comprises:

adjusting amplitude of the fourth processing signal based on the first processing signal, so that the amplitude of the second processing signal is the same as or approximately the same as amplitude of a second near-field interference signal in the first processing signal; and adjusting a phase of the fourth processing signal based on the first processing signal, so that a difference between the phase of the second processing signal and a phase of the second near-field interference signal in the first processing signal is 180° or approximately 180°.

* * * * *